(12) United States Patent
Sakata et al.

(10) Patent No.: US 12,088,175 B2
(45) Date of Patent: Sep. 10, 2024

(54) ELECTRIC PUMP

(71) Applicant: NIDEC TOSOK CORPORATION, Kanagawa (JP)

(72) Inventors: Tomohiro Sakata, Kanagawa (JP); Shigehiro Kataoka, Kanagawa (JP)

(73) Assignee: NIDEC TOSOK CORPORATION, Kanagawa (JP)

(*) Notice: Subject to any disclaimer, the term of this patent is extended or adjusted under 35 U.S.C. 154(b) by 265 days.

(21) Appl. No.: 17/848,402

(22) Filed: Jun. 24, 2022

(65) Prior Publication Data
US 2022/0416617 A1 Dec. 29, 2022

(30) Foreign Application Priority Data

Jun. 25, 2021 (JP) .................. 2021-105534

(51) Int. Cl.
| | |
|---|---|
| *H02K 11/33* | (2016.01) |
| *H02K 3/52* | (2006.01) |
| *H02K 5/22* | (2006.01) |
| *H02K 7/14* | (2006.01) |
| *H02K 11/38* | (2016.01) |

(52) U.S. Cl.
CPC .............. *H02K 5/225* (2013.01); *H02K 7/14* (2013.01); *H02K 11/33* (2016.01); *H02K 3/522* (2013.01); *H02K 11/38* (2016.01); *H02K 2203/03* (2013.01); *H02K 2213/03* (2013.01)

(58) Field of Classification Search
CPC ........ H02K 3/522; H02K 11/33; H02K 11/38; H02K 2203/03
See application file for complete search history.

(56) References Cited

U.S. PATENT DOCUMENTS

| | | | |
|---|---|---|---|
| 2018/0351428 A1* | 12/2018 | Okamoto | ................ H02K 3/28 |
| 2019/0195347 A1* | 6/2019 | Kataoka | ............. F16H 57/0446 |
| 2020/0106321 A1* | 4/2020 | Homma | ................ H02K 1/278 |

FOREIGN PATENT DOCUMENTS

JP 201975872 A 5/2019

* cited by examiner

*Primary Examiner* — Gary A Nash
(74) *Attorney, Agent, or Firm* — HAUPTMAN HAM, LLP

(57) ABSTRACT

An electric pump includes a motor including a rotor rotatable about an axis extending in an axial direction and a stator with a coil wire, a pump connected to the rotor, a circuit board on a first side in the axial direction of the motor, and a coil guide between the motor and the circuit board. The coil wire extends to the first side in the axial direction and is connected to the circuit board. The coil guide includes a first portion guiding the coil wire along the axial direction, and a second portion which faces the motor and in which the first portion is opened. The second portion is a surface inclined to the first side in the axial direction toward an opening of the first portion. A width of the second portion as viewed from the axial direction decreases toward the opening of the first portion.

9 Claims, 6 Drawing Sheets

ELECTRIC PUMP

CROSS-REFERENCE TO RELATED APPLICATIONS

The present invention claims priority under 35 U.S.C. § 119 to Japanese Patent Application No. 2021-105534 filed on Jun. 25, 2021, the entire content of which is incorporated herein by reference.

FIELD OF THE INVENTION

The present invention relates to an electric pump.

BACKGROUND

Conventionally, a configuration in which a motor including a rotor portion and a stator and a control unit that controls power supplied to the motor to control operation of the motor are provided in a housing of an electric pump is known. In this configuration, three-phase alternating current is output from a switching element provided in the control unit to a coil of the stator via a bus bar, so that the rotor portion is rotationally driven.

In the electric pump as described above, the bus bar is arranged between the stator of the motor and the control unit. For this reason, it is necessary to secure a space for arranging the bus bar between the stator of the motor and the control unit, which may have caused increase in size of the electric pump.

SUMMARY

One aspect of an exemplary electric pump of the present invention includes a motor including a rotor portion rotatable about a central axis extending in an axial direction and a stator portion around which a coil wire is wound, a pump mechanism connected to the rotor portion, a circuit board provided on a first side in the axial direction of the motor, and a coil guide that is arranged between the motor and the circuit board and guides the coil wire. The coil wire extends to the first side in the axial direction and is connected to the circuit board. The coil guide includes a first coil guide portion that guides the coil wire along the axial direction, and a second coil guide portion which is provided on a facing surface facing the motor and in which the first coil guide portion is opened. The second coil guide portion is an inclined surface inclined to the first side in the axial direction toward an opening portion of the first coil guide portion. A width of the second coil guide portion as viewed from the axial direction decreases toward the opening portion of the first coil guide portion.

The above and other elements, features, steps, characteristics and advantages of the present disclosure will become more apparent from the following detailed description of the preferred embodiments with reference to the attached drawings.

DETAILED DESCRIPTION

In description below, a direction in which a Z axis illustrated in each diagram extends is referred to as a vertical direction, the side (+Z side) to which an arrow of the Z axis is directed is referred to as the "upper side", and the opposite side (−Z side) to the side to which the arrow of the Z axis is directed is referred to as the "lower side". A central axis J1 illustrated in a diagram below is a virtual axis extending in parallel with the Z axis. Unless otherwise described, a direction parallel to an axial direction of the central axis J1, that is, a Z axis direction is simply referred to as the term "axial direction", "axial", or "axially", a radial direction about the central axis J1 is simply referred to as the term "radial direction", "radial", or "radially", and a circumferential direction about the central axis J1 is simply referred to as the term "circumferential direction", "circumferential", or "circumferentially". In the radial direction, a direction approaching the central axis J1 is referred to as a radial inside, and a direction away from the central axis J1 is referred to as a radial outside. Note that, in the present embodiment, the "parallel direction" also includes a substantially parallel direction, and the "perpendicular direction" also includes a substantially perpendicular direction. In the present embodiment, the upper side corresponds to the "first side in the axial direction", and the lower side corresponds to the "second side in the axial direction".

The vertical direction, the upper side, and the lower side are merely names for describing a relative positional relationship between each unit, and an actual layout relationship and the like may be other than a layout relationship indicated by these names.

Figure 1:
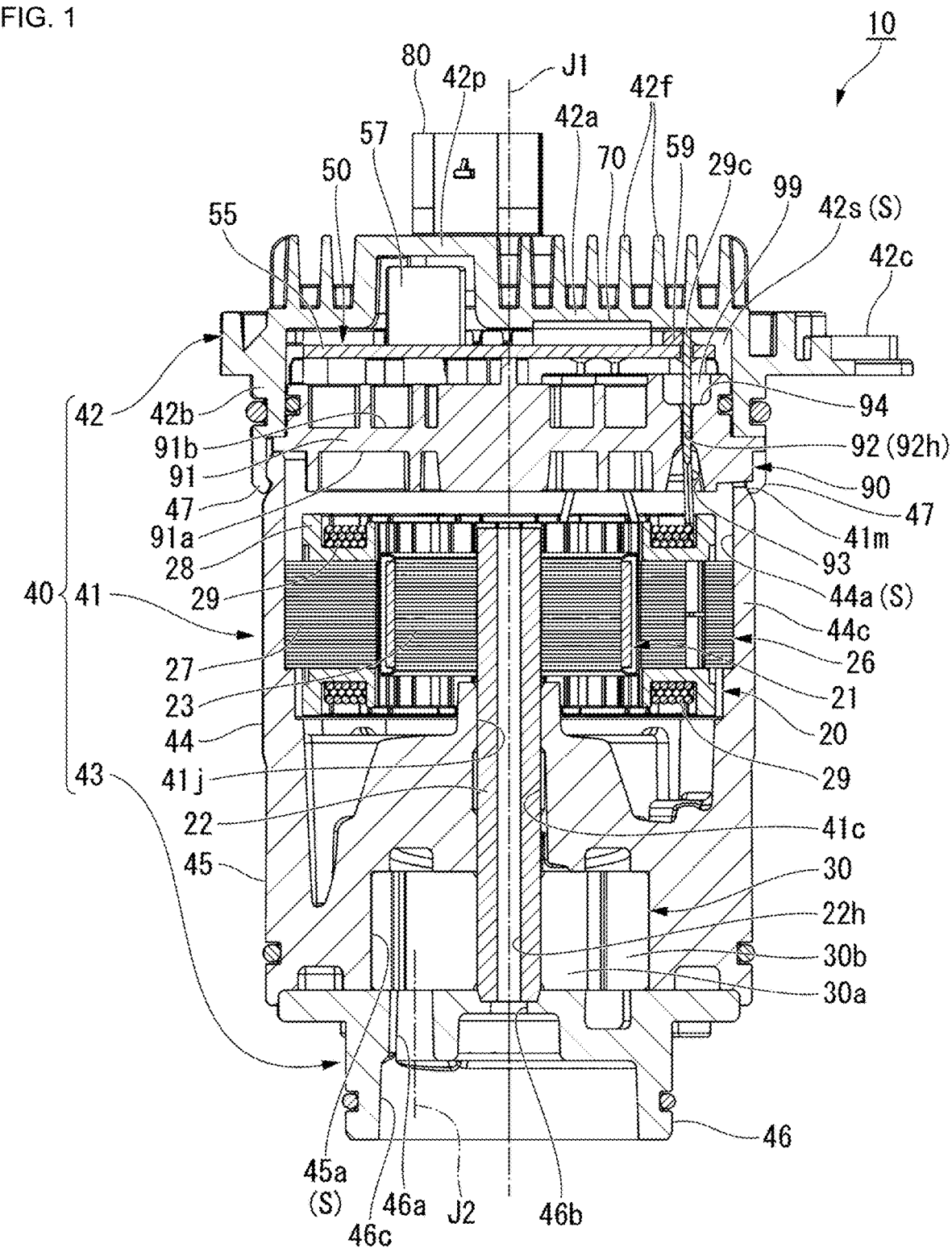
FIG. 1 is a longitudinal cross-sectional view illustrating an electric pump of an embodiment.

A pump 10 of the present embodiment illustrated in FIG. 1 is, for example, an electric pump mounted on a vehicle.

The pump 10 sends fluid inside a vehicle. The fluid sent by the pump 10 is, for example, oil. The oil is, for example, automatic transmission fluid (ATF). As illustrated in FIG. 1, the pump 10 of the present embodiment includes a motor 20, a pump mechanism 30, a housing 40, a circuit board 50, and a coil guide (seal member) 90.

The motor 20, the pump mechanism 30, and the circuit board 50 are housed in the housing 40.

The housing 40 includes a housing main body portion 41, a cover 42, and a pump cover 43. A housing space S for housing the motor 20, the pump mechanism 30, and the circuit board 50 is provided in the housing 40.

The housing main body portion 41 includes a motor housing 44 and a pump housing 45. In the present embodiment, the motor housing 44 and the pump housing 45 are a part of the same single member.

In the present embodiment, the motor housing 44 has a tubular portion 44c having a cylindrical shape extending in the axial direction. The motor housing 44 is arranged on the upper side (first side) in the axial direction with respect to the pump housing 45. The tubular portion 44c has a motor housing recessed portion 44a that opens vertically and constitutes a part of the housing space S. The motor 20 is housed radially inside the motor housing recessed portion 44a.

The pump housing 45 is connected to the lower side of the motor housing 44. The pump housing 45 includes a pump housing recessed portion 45a that is a recessed portion opened on the lower side and constitutes a part of the housing space S. The opening on the lower side of the pump housing recessed portion 45a is covered with the pump cover 43. The pump mechanism 30 is housed radially inside the pump housing recessed portion 45a.

The pump cover 43 is mounted on a bottom portion of the pump housing 45 with a plurality of bolts (not illustrated). The pump cover 43 has a protruding portion 46 having a tubular shape extending downward (to the second side in the axial direction). The protruding portion 46 extends downward from a bottom portion of the pump cover 43. The protruding portion 46 has a lower recessed portion 46c. The lower recessed portion 46c is recessed upward from a lower end of the protruding portion 46.

The protruding portion 46 has an inlet 46a. The inlet 46a extends in the axial direction about a second central axis J2. The second central axis J2 is arranged at a position shifted from the central axis J1 in the radial direction. The second central axis J2 and the central axis J1 extend in parallel to each other. The lower end of the inlet 46a is opened facing the lower recessed portion 46c. The inlet 46a allows an internal space of the pump housing recessed portion 45a and the lower recessed portion 46c to communicate with each other. The inlet 46a is composed of a hole penetrating the pump cover 43 in the axial direction. The inlet 46a allows oil to flow into the pump mechanism 30. That is, the pump mechanism 30 sucks oil from the outside of a device through the inlet 46a.

The protruding portion 46 has an outlet 46b. The outlet 46b extends in the axial direction about the central axis J1. The lower end of the outlet 46b is opened facing the lower recessed portion 46c. The outlet 46b allows a shaft through hole 22h of a shaft 22 to be described later to communicate with the lower recessed portion 46c. The outlet 46b is composed of a hole penetrating the pump cover 43 in the axial direction. The outlet 46b allows oil flowing from the pump mechanism 30 into the motor housing recessed portion 44a and passing through the shaft through hole 22h to flow out.

The housing main body portion 41 has a through hole 41c axially connecting the inside of the motor housing recessed portion 44a and the inside of the pump housing recessed portion 45a. The shaft 22 to be described later is inserted into the through hole 41c. A slide bearing 41j that rotatably supports the shaft 22 about the central axis J1 is provided on a part of an inner peripheral surface of the through hole 41c in the axial direction.

A cover engagement groove 41m is provided at the upper end of the housing main body portion 41. The cover engagement groove 41m is continuous in a circumferential direction around the central axis J1 on an outer peripheral surface of the housing main body portion 41.

The cover 42 integrally includes a cover main body portion 42a, a cover tubular portion 42b, and a flange 42c.

The cover main body portion 42a has a plate shape and is arranged along a plane orthogonal to the axial direction. The cover tubular portion 42b protrudes downward along the axial direction from an outer peripheral portion of the cover main body portion 42a. A plurality of engaging claws 47 are provided at the lower end of the cover tubular portion 42b. A plurality of the engaging claws 47 are arranged at intervals in the circumferential direction. Each of the engaging claws 47 extends downward from the cover tubular portion 42b. Each of the engaging claws 47 is engaged with the cover engagement groove 41m of the housing main body portion 41. The cover 42 is mounted on the housing main body portion 41 as a plurality of the engaging claws 47 are engaged with the cover engagement groove 41m. The cover 42 closes the motor housing recessed portion 44a of the housing main body portion 41 from above. The cover 42 includes a board housing recessed portion 42s that constitutes apart of the housing space S and houses the circuit board 50 on the radially inner side of the cover tubular portion 42b.

The flange 42c protrudes radially outward from an outer peripheral portion of the cover main body portion 42a. A plurality of the flanges 42c are provided at intervals in the circumferential direction on the outer peripheral portion of the cover main body portion 42a. Each of the flanges 42c is fixed to a mounting target location with a bolt (not illustrated).

The cover 42 is provided with a connector portion 80. The connector portion 80 protrudes upward from the cover 42 to the first side in the axial direction. The connector portion 80 is connected to the circuit board 50, and for example, an external power supply is connected to the connector portion 80. In this manner, the circuit board 50 can supply power supplied from the connector portion 80 to a stator portion 26 described later.

The motor 20 is housed in the motor housing recessed portion 44a. The motor 20 includes a rotor portion 21 and a stator portion 26.

The rotor portion 21 rotates about the central axis J1. The rotor portion 21 includes the shaft 22 and a rotor core 23.

The shaft 22 extends along the central axis J1. The shaft 22 is rotatable about the central axis J1. An end portion on the lower side of the shaft 22 protrudes into the pump housing recessed portion 45a via the through hole 41c and is connected to the pump mechanism 30.

The shaft 22 has a shaft through hole 22h. The shaft through hole 22h extends along the axis.

The upper end of the shaft through hole 22h opens upward of the rotor portion 21. The lower end of the shaft through hole 22h opens to the outlet 46b.

At least a part of oil flowing from the inlet 46a flows from the pump housing recessed portion 45a into the motor housing recessed portion 44a through a gap between an inner peripheral surface of the through hole 41c and an outer peripheral surface of the shaft 22. The motor 20 is immersed in oil flowing into the motor housing recessed portion 44a. Oil in the motor housing recessed portion 44a flows into the shaft through hole 22h opened in an end portion on the upper side of the shaft 22. The oil flowing into the shaft through hole 22h flows downward in the shaft through hole 22h and flows out from the outlet 46b.

The rotor core 23 is fixed to an outer peripheral surface of the shaft 22. The rotor core 23 has an annular shape about the central axis J1. The rotor core 23 has a tubular shape extending in the axial direction. The rotor core 23 is configured by, for example, laminating a plurality of electromagnetic steel sheets in the axial direction.

The stator portion 26 is arranged radially outside the rotor portion 21 and faces the rotor portion 21 with a gap between them in the radial direction. That is, the stator portion 26 faces the rotor portion 21 in the radial direction. The stator portion 26 surrounds the rotor portion 21 from the radially outer side over the entire circumference in the circumferential direction. The stator portion 26 includes a stator core 27 and a plurality of coils 29.

The stator core 27 has an annular shape about the central axis J1. The stator core 27 has a tubular shape extending in the axial direction. The stator core 27 surrounds the rotor portion 21 from the outside in the radial direction. The stator core 27 is arranged radially outside the rotor portion 21 and faces the rotor portion 21 with a gap between them in the radial direction. The stator core 27 is configured by, for example, laminating a plurality of electromagnetic steel sheets in the axial direction. A radially outer surface of the stator core 27 is fixed to an inner peripheral surface of the tubular portion 44c.

A plurality of the coils 29 are attached to the stator core 27 with an insulator 28 interposed between them. That is, a plurality of the coils 29 are attached to the stator core 27 with the insulator 28 interposed between them. For example, an insulating material such as a resin is used as a material for the insulator 28. Each of a plurality of the coils 29 is configured by winding a coil wire 29c around each of a plurality of teeth (not illustrated) provided on the stator core 27 with the insulator 28 interposed between them.

Figure 2:
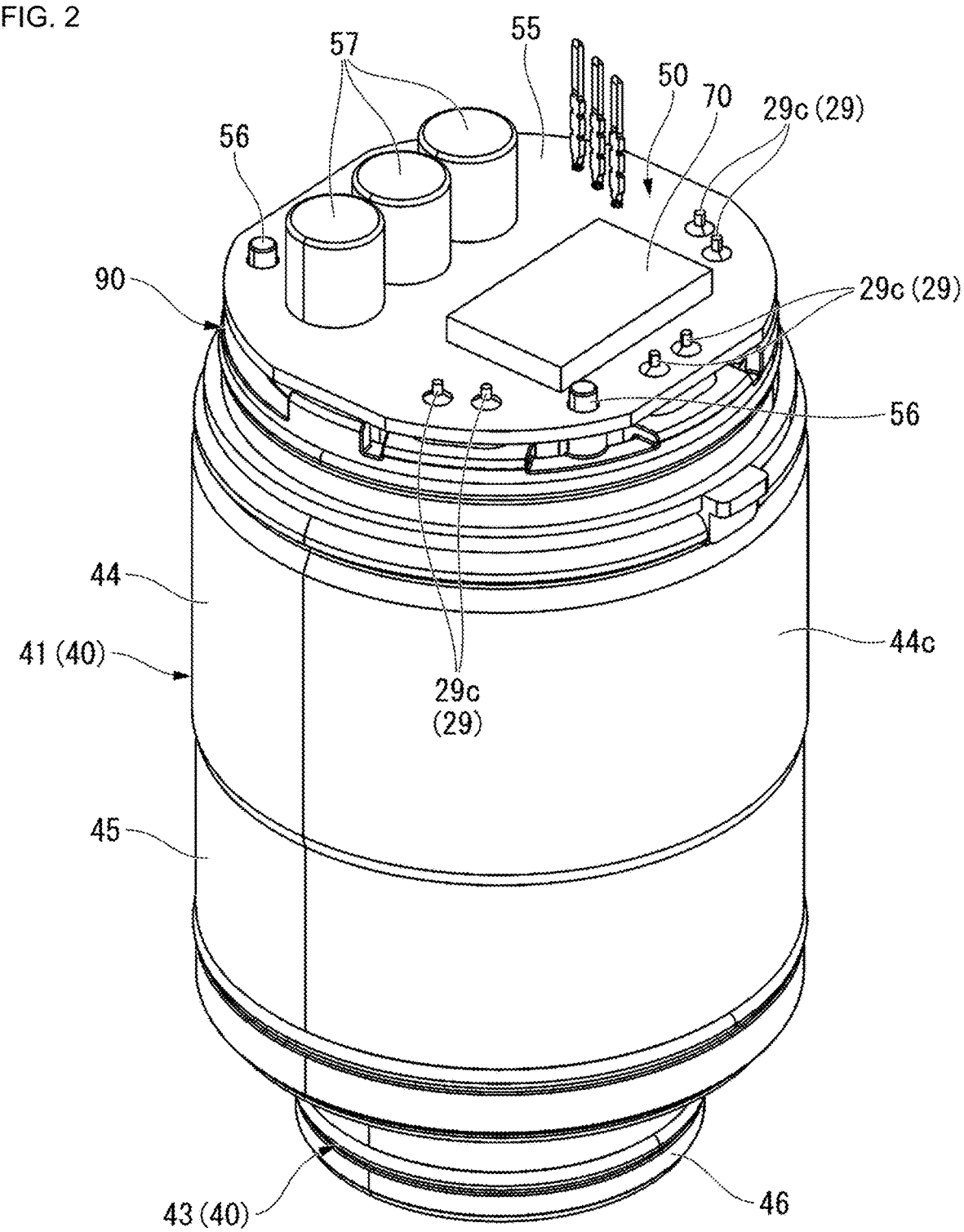
FIG. 2 is a perspective view of the electric pump according to the embodiment in a state in which a cover is removed.

The motor 20 of the present embodiment is a three-phase motor. A plurality of the coils 29 include U-phase, V-phase, and W-phase coils. Each of the coils 29 is connected to a portion corresponding to any of the U phase, the V phase, and the W phase of the circuit board 50. As illustrated in FIG. 2, the coil wire 29c of each of the coils 29 extends upward from the coil 29 and is connected to the circuit board 50 via the coil guide 90 described later.

As illustrated in FIG. 1, the pump mechanism 30 is driven by the motor 20. The pump mechanism 30 is arranged below the stator portion 26. The pump mechanism 30 is connected to the shaft 22 of the rotor portion 21. In the present embodiment, the pump mechanism 30 has a trochoid pump structure. The pump mechanism 30 includes an inner rotor 30a and an outer rotor 30b located radially outside the inner rotor 30a. The inner rotor 30a and the outer rotor 30b are pump gears and mesh with each other. Each of the inner rotor 30a and the outer rotor 30b has a trochoid tooth shape. The inner rotor 30a is fixed to an end portion on the second side in the axial direction of the shaft 22. In this manner, the pump mechanism 30 is driven by the inner rotor 30a being rotated together with the shaft 22.

As illustrated in FIG. 2, the circuit board 50 includes a base material 55. The circuit board 50 is located on the first side in the axial direction of the motor 20. The base material 55 has a plate shape with a plate surface facing the axial direction. The base material 55 is supported from the second side in the axial direction by the coil guide 90 to be described later. The base material 55 is positioned on the coil guide 90 by a pin 56 provided on the coil guide 90.

A tip of the coil wire 29c of the coil 29 of each phase constituting the stator portion 26 is electrically connected to the base material 55. In the present embodiment, the coil wires 29c of the stator portion 26 are connected to the base material 55 at three positions spaced apart in the circumferential direction in an outer peripheral portion of the circuit board 50. Two of the coil wires 29c are arranged at each position of the circuit board 50. Each of the coil wire 29c is a part of one of the U-phase, V-phase, and W-phase coils 29.

The base material 55 of the circuit board 50 is provided with a plurality of electronic components 57, a heat dissipation material 70, and the like. The electronic component 57 is, for example, a capacitor. As the electronic component 57 Three pairs of the first coil guide portions 92 are arranged at intervals in the circumferential direction on an outer peripheral portion of the first coil guide portion 92, a processor, an inverter, and the like can be mounted on the base material 55 in addition to a capacitor. The inverter is electrically connected to the stator portion 26 via the coil wire 29c of the coil 29 connected to the circuit board 50. That is, the coil wire 29c extends to the first side in the axial direction and is connected to the circuit board 50.

The heat dissipation material 70 releases heat of a heat generating member that generates heat when a pump is driven, such as a processor or an inverter. The heat dissipation material 70 includes, for example, a material having high thermal conductivity, such as an aluminum-based material or a copper-based material. The heat dissipation material 70 may be in contact with the cover main body portion 42a of the cover 42.

As illustrated in FIG. 1, the cover 42 includes a plurality of heat dissipation fins 42f and a component housing protruding portion 42p. A plurality of the heat dissipation fins 42f are provided so as to protrude upward from the cover main body portion 42a. The component housing protruding portion 42p is provided in such a manner that a part of the cover main body portion 42a is recessed upward. For example, the electronic component 57 is housed on the inner side of the component housing protruding portion 42p.

The coil guide 90 guides the coil wire 29c. The coil guide 90 is provided below the circuit board 50. The coil guide 90 is arranged between the stator portion 26 and the circuit board 50. The coil guide 90 holds the coil wire 29c extending upward from a winding portion of the coil 29. The coil guide 90 seals and partitions the housing space S between the motor 20 and the circuit board 50. The coil guide 90 is made from an insulating resin material. As illustrated in FIGS. 3 to 6, the coil guide 90 includes a coil guide main body (seal member main body) 91, a first coil guide portion 92, a second coil guide portion 93, and a potting region 94.

The coil guide main body 91 is provided along a plane orthogonal to the axis. The coil guide main body 91 has a disk shape when viewed from the axial direction. The coil guide main body 91 is provided at the upper end of the housing main body portion 41 so as to close an opening of the cover tubular portion 42b. The coil guide main body 91 is sandwiched between the tubular portion 44c of the housing main body portion 41 and the cover tubular portion 42b of the cover 42. The coil guide main body 91 has a lower surface (opposing surface, first surface) 91a facing downward in the axial direction and facing the motor 20, and an upper surface (second surface) 91b facing the circuit board 50.

The first coil guide portion 92 penetrates the coil guide main body 91 in the axial direction and holds the coil wire 29c. The first coil guide portion 92 guides the coil wire 29c along the axial direction. As illustrated in FIGS. 2 to 5, in the present embodiment, three pairs of the first coil guide portions 92 are provided corresponding to the U-phase, V-phase, and W-phase coils 29. Three pairs of the first coil guide portions 92 are arranged at intervals in the circumferential direction on an outer peripheral portion of the coil guide main body 91.

As illustrated in FIGS. 1 and 3 to 5, each of the first coil guide portions 92 is a through hole 92h penetrating the coil guide main body 91 in the axial direction. The first coil guide portion 92 may be, for example, a notch or the like provided to be recessed radially inward from an outer peripheral portion of the coil guide main body 91 as long as the first coil guide portion 92 penetrates the coil guide main body 91 in the axial direction and can hold the coil wire 29c. A hole diameter of the first coil guide portion 92 (through hole 92h) is preferably 1.5 times or less a wire diameter of the coil wire 29c. In the present embodiment, the hole diameter of the first coil guide portion 92 is, for example, 1.4 mm, and the wire diameter of the coil wire 29c is, for example, 1 mm. In this manner, a gap having a total diameter of 0.4 mm is formed between an inner peripheral surface of the first coil guide portion 92 and an outer peripheral surface of the coil wire 29c.

Figure 3:
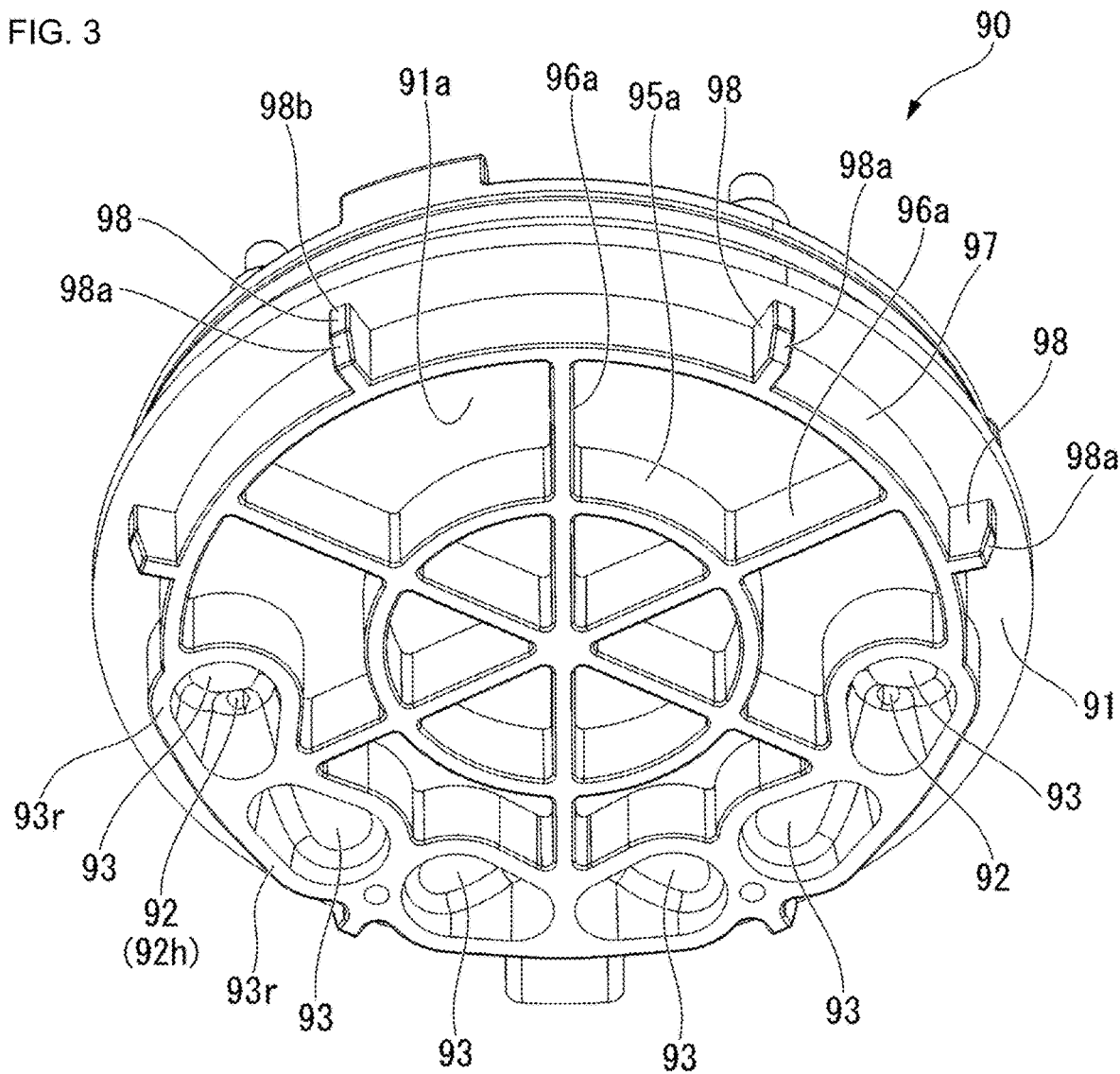
FIG. 3 is a view of a coil guide of the electric pump of the embodiment as viewed obliquely from below.
Figure 4:
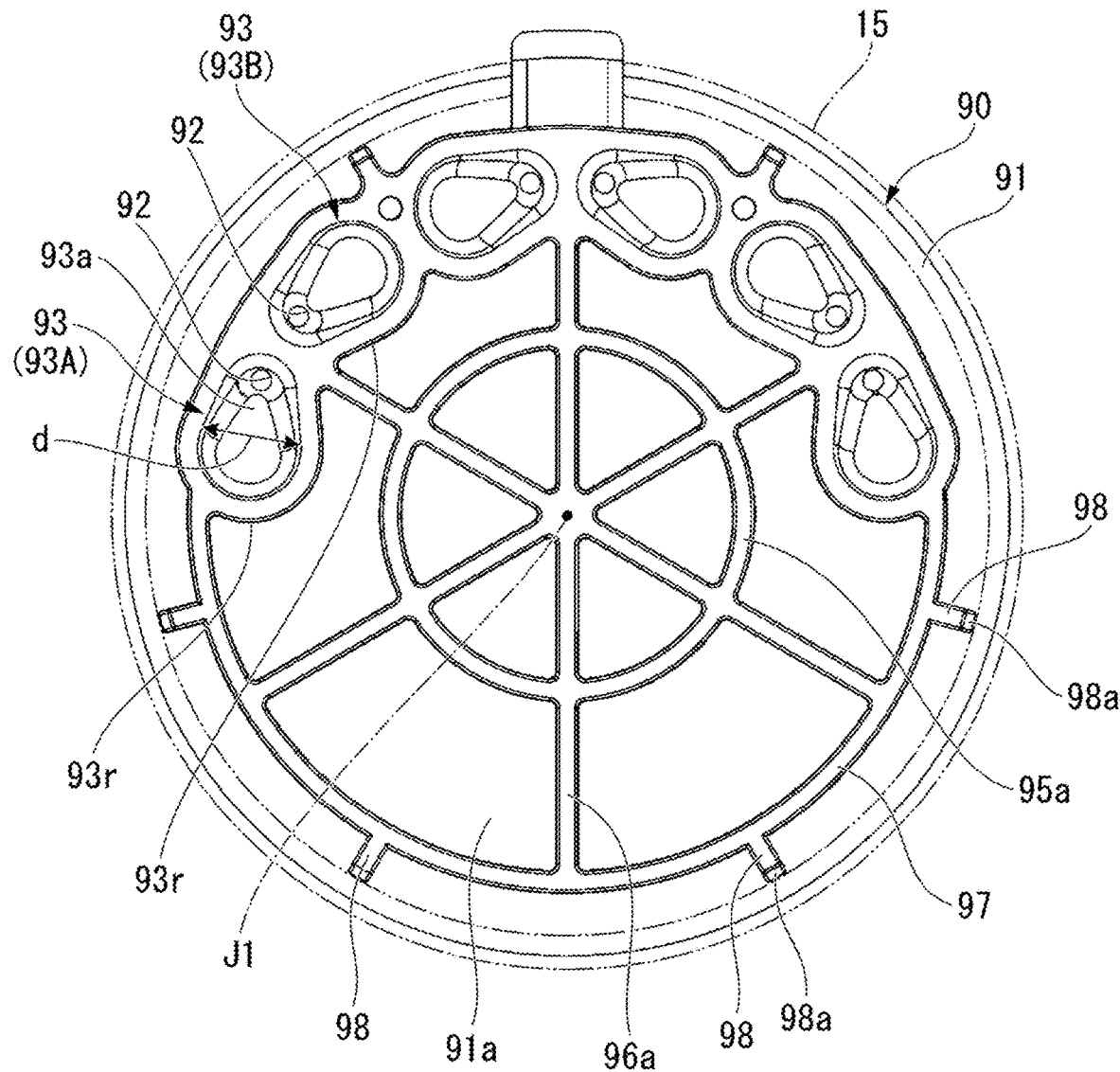
FIG. 4 is a bottom view of the coil guide of the embodiment.
Figure 5:
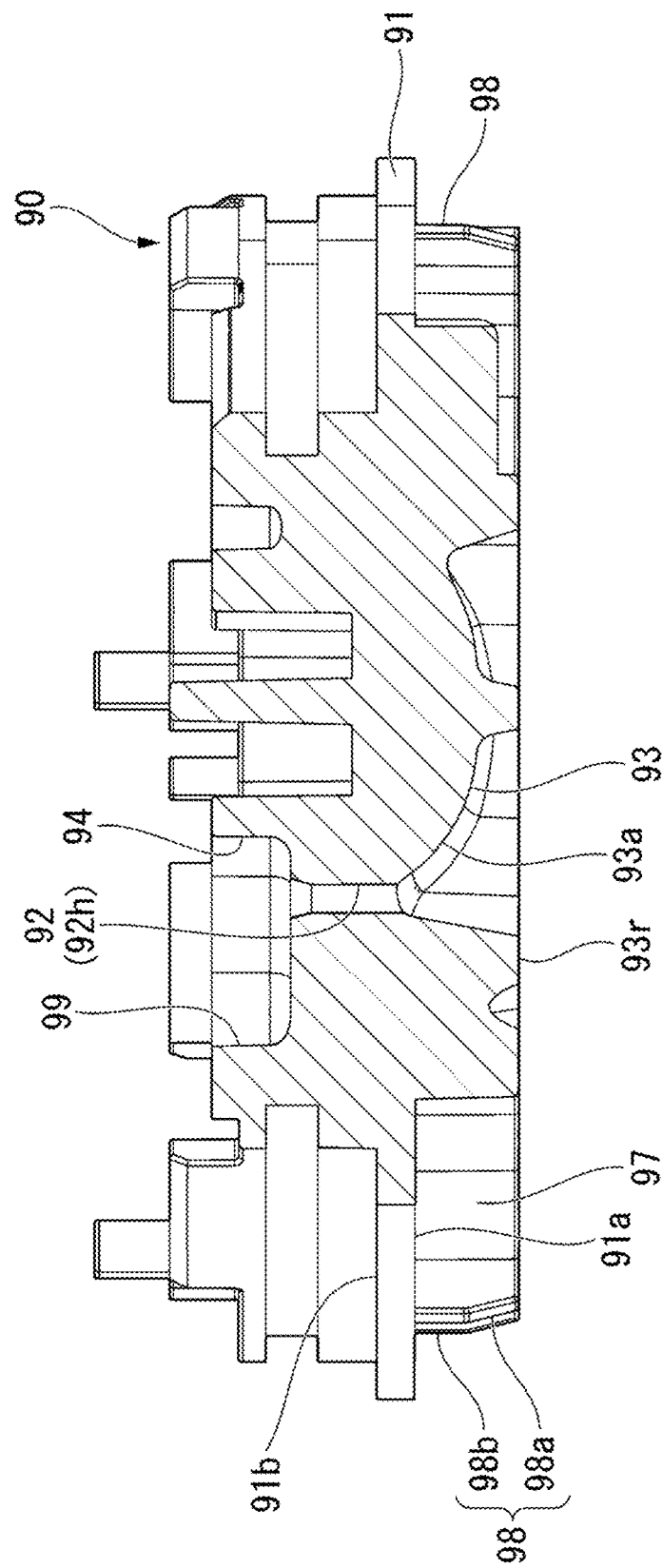
FIG. 5 is a cross-sectional view of a second coil guide portion, a first coil guide portion, and a potting region in the coil guide of the embodiment.

As illustrated in FIGS. 3 to 5, the second coil guide portion 93 is provided on the lower surface 91a of the coil guide main body 91. The second coil guide portion 93 guides the coil wire 29c inserted into the through hole 92h toward an opening portion of the through hole 92h of the first coil guide portion 92 when the pump 10 is assembled. The second coil guide portion 93 has an inclined surface 93a and a surrounding rib 93r. That is, at least a part of the second coil guide portion 93 is the inclined surface 93a.

As illustrated in FIG. 4, the inclined surface 93a has a substantially teardrop shape and extends in the circumferential direction when viewed from the axial direction. An opening portion of the through hole 92h is opened in a one end portion in the circumferential direction of the inclined surface 93a. In this manner, the first coil guide portion 92 opens in the second coil guide portion 93.

That is, the coil guide 90 includes three pairs of the second coil guide portions 93 and three pairs of the first coil guide portions 92. Each pair of the second coil guide portions 93 of three pairs of the second coil guide portions 93 are arranged adjacent to each other when viewed from the axial direction.

An opening portion of the first coil guide portion 92 is located in an end portion on the first side or the second side in the circumferential direction in the second coil guide portion 93. As to the second coil guide portion 93 of each of a pair of the second coil guide portions 93, in each pair of three pairs of the second coil guide portions 93 in which an opening portion of the first coil guide portion 92 is arranged in an end portion on the adjacent second coil guide portion 93 side, a second coil guide portion 93A located on the first side in the circumferential direction and a second coil guide portion 93B located on the second side in the circumferential direction are arranged such that opening portions of the first coil guide portions 92 are adjacent to each other. That is, an opening portion of the second coil guide portion 93A is located in an end portion on the second side in the circumferential direction of the inclined surface 93a of the second coil guide portion 93A. An opening portion of the second coil guide portion 93B is located in an end portion on the first side in the circumferential direction on the inclined surface 93a of the second coil guide portion 93B.

A width d of the inclined surface 93a viewed from the axial direction becomes narrower toward an opening portion of the first coil guide portion 92 in the circumferential direction. The inclined surface 93a is inclined to the first side (upper side) in the axial direction toward the opening portion of the first coil guide portion 92 in the circumferential direction. As illustrated in FIG. 5, the inclined surface 93a is inclined steeply as approaching the first coil guide portion 92. That is, the inclined surface 93a has an inclination angle that increases as approaching the first coil guide portion 92. The inclined surface 93a is curved in an arc shape from a position farthest from an opening portion toward the opening portion in the circumferential direction in a cross-sectional view along the axial direction.

Note that the inclined surface 93a may be inclined upward toward the opening portion of the first coil guide portion 92 in the radial direction.

As illustrated in FIGS. 3 and 4, the surrounding rib 93r is provided so as to surround the inclined surface 93a of the second coil guide portion 93 when viewed from the axial direction. The surrounding rib 93r has a tubular shape protruding downward (to the second side in the axial direction) from the lower surface 91a of the coil guide main body 91. Three pairs of the surrounding ribs 93r surrounding three pairs of the second coil guide portions 93 are connected to each other and provided continuously in the circumferential direction.

The coil guide 90 includes an insertion tube portion (insertion portion) 97, a ridge portion 98, a circumferential rib 95a, and a radial rib 96a. The insertion tube portion 97, the ridge portion 98, the circumferential rib 95a, and the radial rib 96a are provided on the lower surface 91a of the coil guide main body 91.

The insertion tube portion 97 extends continuously in the circumferential direction from the first end side in the circumferential direction of three pairs of the surrounding ribs 93r and is connected to the second end side in the circumferential direction of three pairs of the surrounding ribs 93r. The insertion tube portion 97 is continuous over the entire circumference in the circumferential direction as three pairs of the surrounding ribs 93r are provided in a part in the circumferential direction. The insertion tube portion 97 protrudes downward from the lower surface 91a. The insertion tube portion 97 is arranged inside the tubular portion 44c in an upper end portion of the housing main body portion 41. That is, the insertion tube portion 97 is inserted into the tubular portion 44c.

The ridge portion 98 is provided on an outer peripheral surface of the insertion tube portion 97. The ridge portions 98 are provided at intervals in the circumferential direction of the insertion tube portion 97. Each of the ridge portions 98 protrudes radially outward from the outer peripheral surface of the insertion tube portion 97 and extends along the axial direction. The ridge portion 98 has a tip surface 98b and a tapered portion 98a. The tip surface 98b faces radially outward and extends in parallel with the axial direction. The tip surface 98b is in contact with an inner peripheral surface of the tubular portion 44c. The tapered portion 98a is provided continuously to the lower side of the tip surface 98b. The tapered portion 98a is provided on an end portion on the lower side (the second side in the axial direction) of the ridge portion 98. A protruding height of the tapered portion 98a from the insertion tube portion 97 to the radially outer side gradually decreases toward the lower side (the second end side in the axial direction). As the tapered portion 98a described above is provided, the insertion tube portion 97 of the coil guide 90 can be easily inserted into the tubular portion 44c. The tip surface 98b of the ridge portion 98 abuts on an inner peripheral surface of the tubular portion 44c, so that the coil guide 90 is mounted on the housing main body portion 41.

In the present embodiment, the case where the ridge portion 98 is provided on an outer peripheral surface of the insertion tube portion 97 having a tubular shape is described. However, the ridge portion may not have a tubular shape as long as the ridge portion is a part (insertion portion) of the coil guide 90 to be inserted into the tubular portion 44c.

The circumferential rib 95a is provided radially inside with respect to the insertion tube portion 97. The circumferential rib 95a has an annular shape when viewed from the axial direction and extends along the circumferential direction.

A plurality of the radial ribs 96a are provided at intervals in the circumferential direction on the lower surface 91a of the coil guide main body 91. A plurality of the radial ribs 96a radially extend from a central portion of the lower surface 91a. Each of the radial ribs 96a extends along the radial direction. The radial rib 96a, the circumferential rib 95a, and the insertion tube portion 97 are connected to each other.

A protruding dimension from the lower surface 91a to the lower direction of the insertion tube portion 97, the ridge portion 98, the circumferential rib 95a, and the radial rib 96a is the same as that of the surrounding rib 93r.

Figure 6:
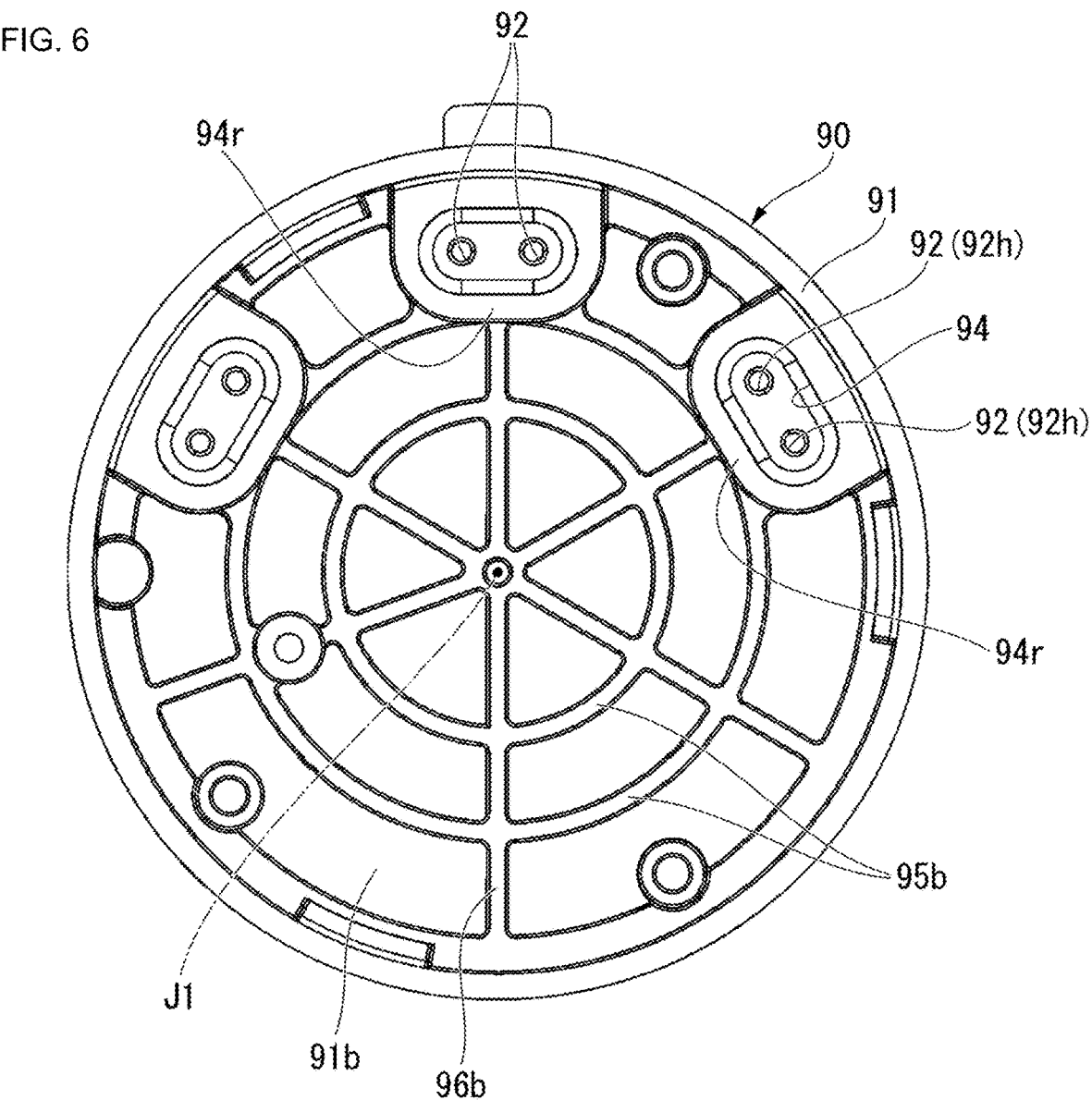
FIG. 6 is a top view of the coil guide of the embodiment.

As illustrated in FIGS. 5 and 6, the potting region 94 is provided on the lower surface 91a or an upper surface 91b of the coil guide main body 91. In the present embodiment, the potting region 94 is provided on the upper surface 91b of the coil guide main body 91. The through hole 92h of the first coil guide portion (coil guide portion) 92 is opened in the potting region 94. The coil guide 90 has three of the potting regions 94. Three of the potting regions 94 are provided at intervals in the circumferential direction on an outer peripheral portion of the coil guide main body 91. Three of the potting regions 94 are arranged at positions corresponding to three pairs of the first coil guide portions 92 with the coil guide main body 91 interposed between them. A pair of the first coil guide portions 92 open in one of the potting regions 94. Each of the potting regions 94 has, for example, an oval shape extending in the circumferential direction when viewed from the axial direction. A peripheral wall 94r protruding upward from the upper surface 91b of the coil guide main body 91 is provided on an outer peripheral portion of each of the potting regions 94. The potting region 94 is filled with a potting material 99.

On the upper surface 91b of the coil guide main body 91, a circumferential rib 95b and a radial rib 96b are provided. The circumferential rib 95b has an annular shape when viewed from the axial direction and extends along the circumferential direction. In the present embodiment, the circumferential ribs 95b are provided doubly in the radial direction with different diameters.

A plurality of the radial ribs 96b are provided at intervals in the circumferential direction on the upper surface 91b of the coil guide main body 91. A plurality of the radial ribs 96b radially extend from a central portion of the upper surface 91b. Each of the radial ribs 96b extends along the radial direction. The radial rib 96b and the circumferential rib 95b are connected to each other.

As illustrated in FIG. 1, the coil wire 29c of the U-phase, V-phase, and W-phase coils 29 is inserted into the through hole 92h of three pairs of the first coil guide portions 92 from below, and protrudes above the coil guide main body 91. Each of the coil wires 29c is inserted into a through hole provided in the circuit board 50 arranged above the coil guide main body 91, and is electrically connected to a circuit on the circuit board 50.

In a portion where the coil wire 29c passes through the through hole 92h, the potting region 94 is filled with the potting material 99, so that a gap between the through hole 92h and the coil wire 29c is sealed.

In the present embodiment, an end portion of the coil wire 29c protrudes farther above than the circuit board 50. A temperature sensor 59 connected to the coil wire 29c is provided on the circuit board 50. The temperature sensor 59 measures a temperature of an end portion of the coil wire 29c connected to the circuit board 50. The coil 29 immersed in oil in the motor housing recessed portion 44a has a temperature substantially equal to that of the oil over time. This temperature is propagated through the coil 29. In this manner, a temperature of the coil wire 29c is detected by the temperature sensor 59, so that a temperature of oil in the housing 40 is detected.

According to the present embodiment, the coil guide 90 arranged between the motor 20 and the circuit board 50 penetrates the coil guide main body 91 in the axial direction and includes the first coil guide portion 92 that holds the coil wire 29c. In this manner, the coil wire 29c can be held and directly connected to the circuit board 50 without use of a bus bar or a connection terminal. Therefore, it is possible to suppress increase in size of the pump 10 in the axial direction and to reduce the size of the pump 10.

Further, the first coil guide portion 92 has the inclined surface 93a that is inclined to the first side in the axial direction toward an opening portion of the first coil guide portion 92. In this manner, the coil wire 29c drawn out from the stator portion 26 can be easily guided to the opening portion along the inclined surface 93a. Further, since the width d of the second coil guide portion 93 becomes narrower toward the opening portion of the first coil guide portion 92, when the coil wire 29c is brought into contact with a portion where the width d of the second coil guide portion 93 is wide, the coil wire 29c can be easily guided to the opening portion. Therefore, the coil wire 29c can be inserted into the opening portion, and the coil wire 29c can be easily and reliably held.

According to the present embodiment, since the first coil guide portion 92 is the through hole 92h, the coil wire 29c can be reliably held in the axial direction as the coil wire 29c is allowed to pass through the through hole 92h.

According to the present embodiment, a hole diameter of the first coil guide portion 92 is 1.5 times or less a wire diameter of the coil wire 29c. In this manner, as a gap between the first coil guide portion 92 and the coil wire 29c is suppressed to be small, the coil wire 29c is reliably held by the first coil guide portion 92. Further, when the potting material 99 is provided in such a manner that a gap between the first coil guide portion 92 and the coil wire 29c is closed, the potting material 99 can be prevented from leaking from the gap between the first coil guide portion 92 and the coil wire 29c.

According to the present embodiment, an opening portion of the first coil guide portion 92 is located in an end portion on the first side or the second side in the circumferential direction in the second coil guide portion 93. In this manner, it is possible to suppress increase in size of the coil guide 90 in the radial direction.

According to the present embodiment, a pair of the second coil guide portions 93 are arranged adjacent to each other when viewed from the axial direction, and in each of the second coil guide portions 93, an opening portion of the first coil guide portion 92 is arranged in an end portion on the adjacent second coil guide portion 93 side. In this manner, the coil guide 90 can hold a pair of the coil wires 29c in the same phase close to each other. Since a pair of the coil wires 29c in the same phase can be brought close to each other and connected to the circuit board 50, connection work of the coil wires 29c to the circuit board 50 is facilitated.

According to the present embodiment, the coil guide 90 includes the surrounding rib 93r surrounding the second coil guide portion 93. In this manner, the coil guide 90 can be reinforced. Further, since the depth of the second coil guide portion 93 can be secured by the surrounding rib 93r, the coil wire 29c can be prevented from coming off the second coil guide portion 93. Further, inclination of the inclined surface 93a can be easily made steep, and the coil wire 29c can be easily guided to the first coil guide portion 92.

According to the present embodiment, strength of the coil guide 90 can be enhanced as the circumferential rib 95a and the radial rib 96a are provided.

According to the present embodiment, since the inclined surface 93*a* is inclined steeply toward the first coil guide portion 92, the coil wire 29*c* can be more easily guided to the first coil guide portion 92.

According to the present embodiment, since the inclined surface 93*a* is curved in an arc shape, the coil wire 29*c* can be more easily guided to the first coil guide portion 92.

According to the present embodiment, the potting region 94 where the first coil guide portion 92 is opened is filled with the potting material 99. In this manner, the coil guide 90 has a function of sealing the coil wire 29*c* in the first coil guide portion 92 in addition to a function of holding the coil wire 29*c*. In this manner, it is not necessary to provide a bus bar, a connection terminal, and a seal member, respectively. Therefore, the number of components of the pump 10 can be reduced, and reduction in cost and size, and improvement in assemblability can be achieved.

According to the present embodiment, since a pair of the first coil guide portions 92 are opened in one of the potting region 94, it is possible to perform potting for the coil wires 29*c* of the same phase together, and workability can be improved.

According to the present embodiment, the coil guide 90 includes the insertion tube portion 97 arranged inside the tubular portion 44*c* of the housing 40 and the ridge portion 98 provided on an outer peripheral surface of the insertion tube portion 97.

In this manner, when the coil guide 90 is fixed to the housing 40, the coil guide 90 can be easily positioned in the radial direction.

According to the present embodiment, since the tapered portion 98*a* is provided in the ridge portion 98, the coil guide 90 can be easily inserted into the housing 40.

According to the present embodiment, the temperature sensor 59 that measures a temperature of an end portion of the coil wire 29*c* connected to the circuit board 50 is provided. In this manner, it is not necessary to provide the temperature sensor 59 in the motor housing recessed portion 44*a*, and it is not necessary to secure a space for providing the temperature sensor 59. This can suppress increase in size of the pump 10. When the temperature sensor 59 is arranged in the motor housing recessed portion 44*a*, a sealing structure is required in a portion where a lead wire from the temperature sensor 59 passes through the coil guide 90. However, the sealing structure is not required as the temperature sensor 59 is connected to the circuit board 50.

Although the embodiment and the variation of the embodiment of the present invention are described above, the configurations, the combinations of the elements described in the embodiment and the variation, and the like are merely examples, and therefore addition, omission, substation and other modifications may be made appropriately within the scope of the present invention. Also note that the present invention is not limited by the embodiment.

For example, the application of the electric pump of the above-described embodiment and the variation of the embodiment is not particularly limited.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An electric pump comprising:
    a motor including a rotor portion rotatable about a central axis extending in an axial direction and a stator portion around which a coil wire is wound;
    a pump mechanism connected to the rotor portion;
    a circuit board provided on a first side in the axial direction of the motor; and
    a coil guide that is arranged between the motor and the circuit board and guides the coil wire,
    wherein the coil wire extends to the first side in the axial direction and is connected to the circuit board,
    the coil guide includes:
    a first coil guide portion that guides the coil wire along the axial direction; and
    a second coil guide portion which is provided on a facing surface facing the motor and in which the first coil guide portion is opened,
    the second coil guide portion is an inclined surface inclined to the first side in the axial direction toward an opening portion of the first coil guide portion, and
    a width of the second coil guide portion as viewed from the axial direction decreases toward the opening portion of the first coil guide portion.

2. The electric pump according to claim 1, wherein the first coil guide portion is a through hole.

3. The electric pump according to claim 2, wherein a hole diameter of the first coil guide portion is 1.5 times or less a wire diameter of the coil wire.

4. The electric pump according to claim 1, wherein an opening portion of the first coil guide portion is located in an end portion on a first side or a second side in a circumferential direction in the second coil guide portion.

5. The electric pump according to claim 1, wherein
    the coil guide includes three pairs of the first coil guide portions and three pairs of the second coil guide portions, and
    a pair of the second coil guide portions are arranged adjacent to each other when viewed from the axial direction, and in each of the second coil guide portions, an opening portion of the first coil guide portion is arranged in an end portion on a side of the second coil guide portion that is adjacent.

6. The electric pump according to claim 1, wherein the coil guide includes a surrounding rib provided on the facing surface and surrounding the second coil guide portion when viewed from the axial direction.

7. The electric pump according to claim 1, wherein
    the coil guide includes:
    a circumferential rib provided on the facing surface and extending along a circumferential direction; and
    a radial rib provided on the facing surface and extending along a radial direction, and
    the circumferential rib and the radial rib are connected to each other.

8. The electric pump according to claim 1, wherein an inclination angle of the inclined surface increases as approaching the first coil guide portion.

9. The electric pump according to claim 8, wherein the inclined surface is curved in an arc shape.

* * * * *